United States Patent
Cho et al.

(10) Patent No.: US 12,152,982 B2
(45) Date of Patent: Nov. 26, 2024

(54) DEVICE AND METHOD FOR MULTI-REFLECTION SOLUTION IMMERSED SILICON-BASED MICROCHANNEL MEASUREMENT

(71) Applicant: KOREA RESEARCH INSTITUTE OF STANDARDS AND SCIENCE, Daejon (KR)

(72) Inventors: Hyun Mo Cho, Daejeon (KR); Dong Hyung Kim, Cheonan (KR); Won Chegal, Daejeon (KR); Yong Jai Cho, Daejeon (KR)

(73) Assignee: Korea Research Institute of Standards and Science, Daejon (KR)

( * ) Notice: Subject to any disclaimer, the term of this patent is extended or adjusted under 35 U.S.C. 154(b) by 187 days.

(21) Appl. No.: 17/921,706

(22) PCT Filed: Sep. 21, 2020

(86) PCT No.: PCT/KR2020/012705
§ 371 (c)(1),
(2) Date: Oct. 27, 2022

(87) PCT Pub. No.: WO2022/059824
PCT Pub. Date: Mar. 24, 2022

(65) Prior Publication Data
US 2023/0168185 A1    Jun. 1, 2023

(30) Foreign Application Priority Data
Sep. 21, 2020  (KR) ................ 10-2020-0121427

(51) Int. Cl.
*G01N 21/21* (2006.01)
*G01N 21/11* (2006.01)
*G01N 21/75* (2006.01)

(52) U.S. Cl.
CPC .......... *G01N 21/211* (2013.01); *G01N 21/11* (2013.01); *G01N 2021/752* (2013.01); *G01N 2201/0638* (2013.01)

(58) Field of Classification Search
CPC .... G01N 21/211; G01N 21/11; G01N 21/031; G01N 21/77; G01N 21/05; G01N 21/553;
(Continued)

(56) References Cited

U.S. PATENT DOCUMENTS

| | | | | |
|---|---|---|---|---|
| 5,959,728 A | * | 9/1999 | Nishimoto | ........... G01N 21/031 356/246 |
| 2006/0170925 A1 | | 8/2006 | Lin et al. | |
| 2017/0138941 A1 | * | 5/2017 | Cao | ........................ G01N 33/587 |

FOREIGN PATENT DOCUMENTS

| | | |
|---|---|---|
| KR | 20010107735 | 12/2001 |
| KR | 101105328 | 1/2012 |

(Continued)

OTHER PUBLICATIONS

KR 20190080999 A Translation (Year: 2019).*

*Primary Examiner* — Dominic J Bologna
*Assistant Examiner* — Carlos Perez-Guzman
(74) *Attorney, Agent, or Firm* — Brooks, Cameron & Huebsch, PLLC

(57) ABSTRACT

An embodiment of the present disclosure provides a multi-reflection silicon-based liquid immersion micro-channel measurement device and measurement method capable of improving measurement sensitivity by completely separating, through multi-reflection, first reflective light reflected by a sample detection layer and a second reflective light by a prism-buffer solution interface and by allowing the light to enter multiple times through the multi-reflection. The multi-reflection silicon-based liquid immersion micro-channel measurement device according to the embodiment of the present disclosure includes a micro-channel structure (Continued)

including a support, and one or more micro-channels formed on the support and each having a sample detection layer with a fixed bioadhesive material for detecting a sample, a sample injection unit configured to inject a buffer solution containing the sample into the micro-channel, a prism unit including a prism, and a reflection structure formed by coating a bottom surface of the prism with a mirror reflection material, the polarized light generating unit configured to generate polarized light, and the polarized light detecting unit configured to detect a polarization change of reflected light.

11 Claims, 13 Drawing Sheets

(58) Field of Classification Search
CPC ....... G01N 2021/752; G01N 2021/757; G01N 2021/7763; G01N 2021/052; G01N 2021/212; G01N 2021/558; G01N 2201/0638; G01J 1/04; G01J 1/0477
See application file for complete search history.

(56) References Cited

FOREIGN PATENT DOCUMENTS

| KR | 101236429 | | 2/2013 | |
|----|-----------|---|--------|---|
| KR | 101383652 | | 4/2014 | |
| KR | 102056971 | | 7/2019 | |
| KR | 20190080999 A | * | 7/2019 | ........ B01L 3/502715 |

* cited by examiner

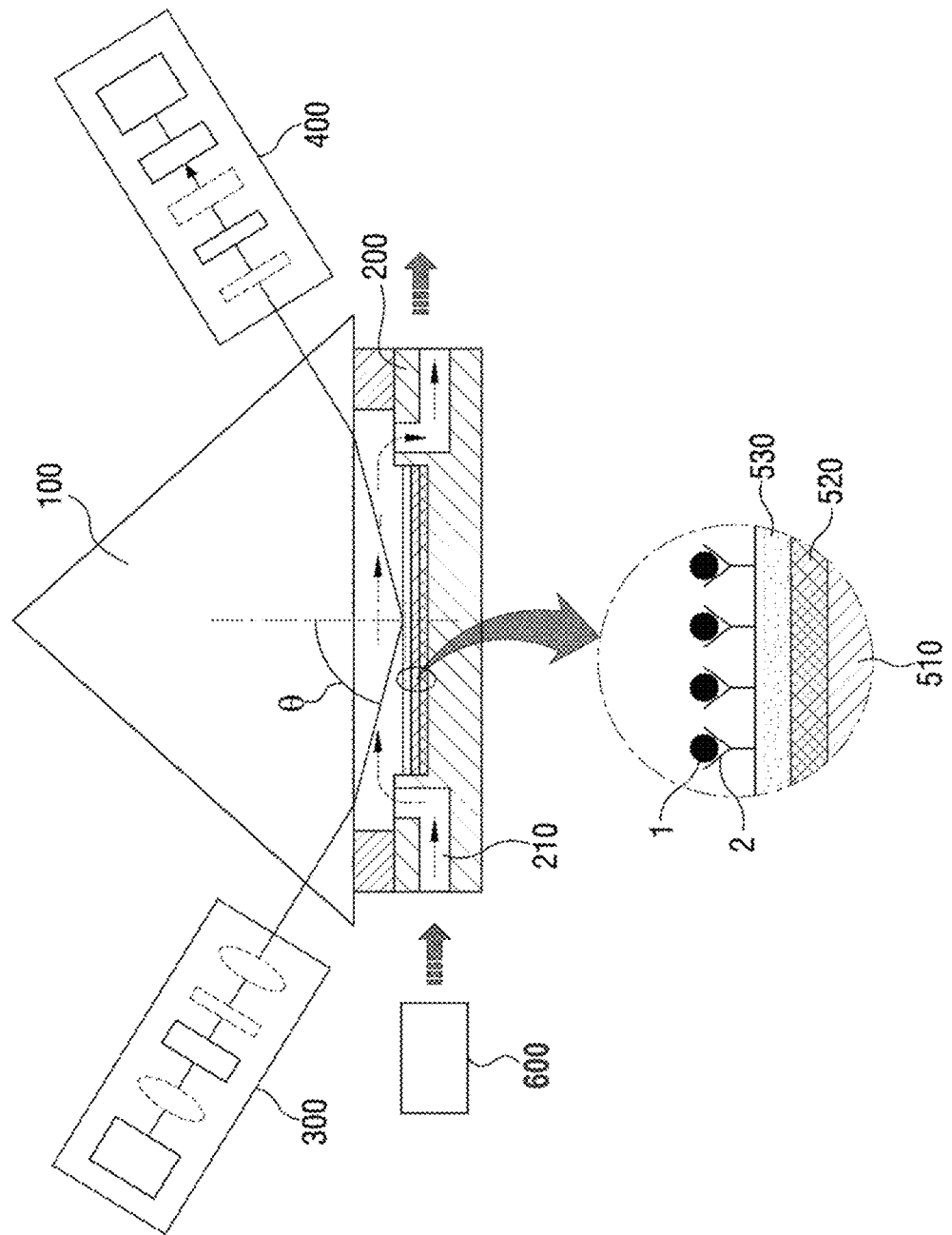
[FIG. 1]

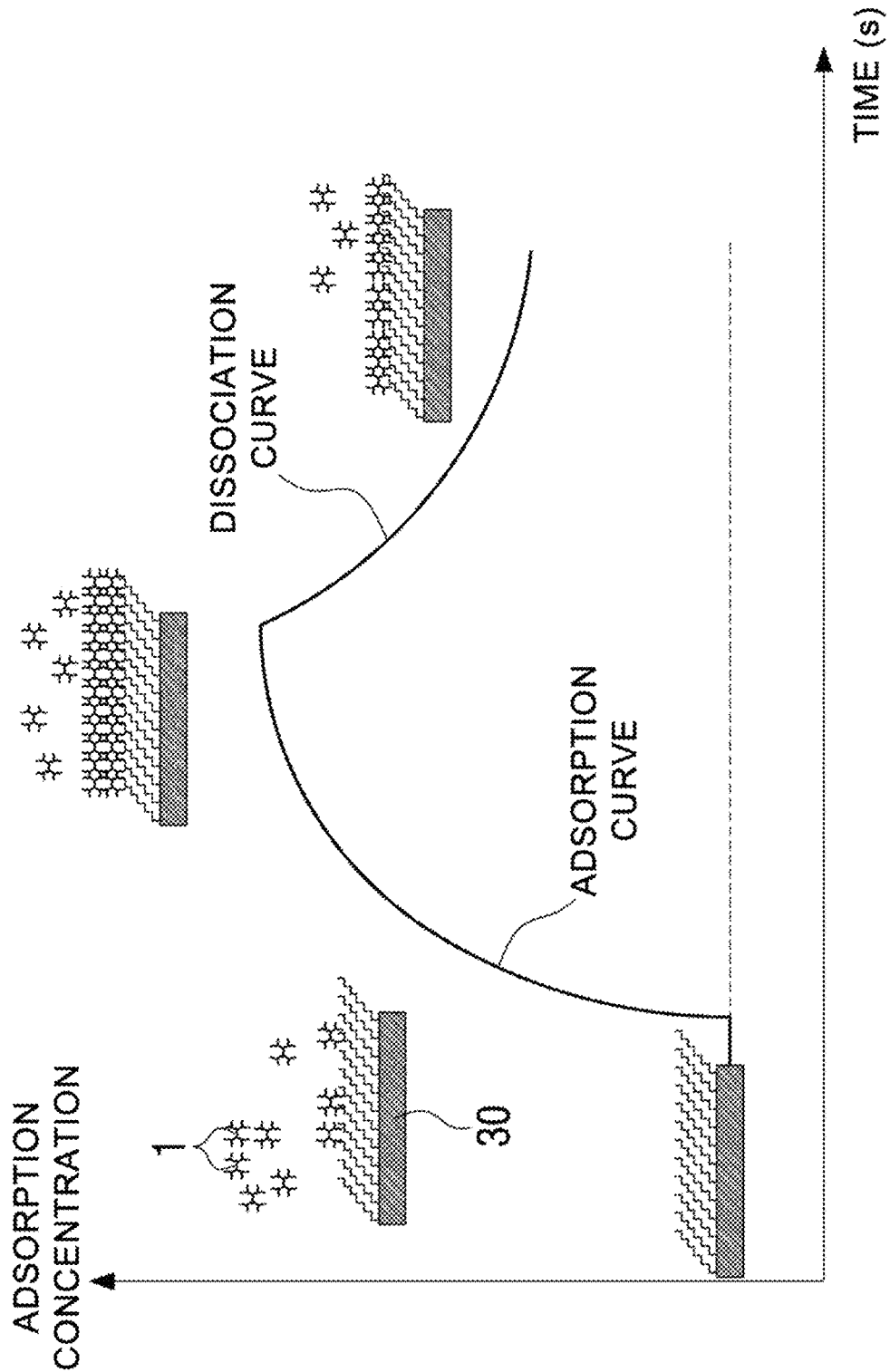
[FIG. 2]

[FIG. 3]
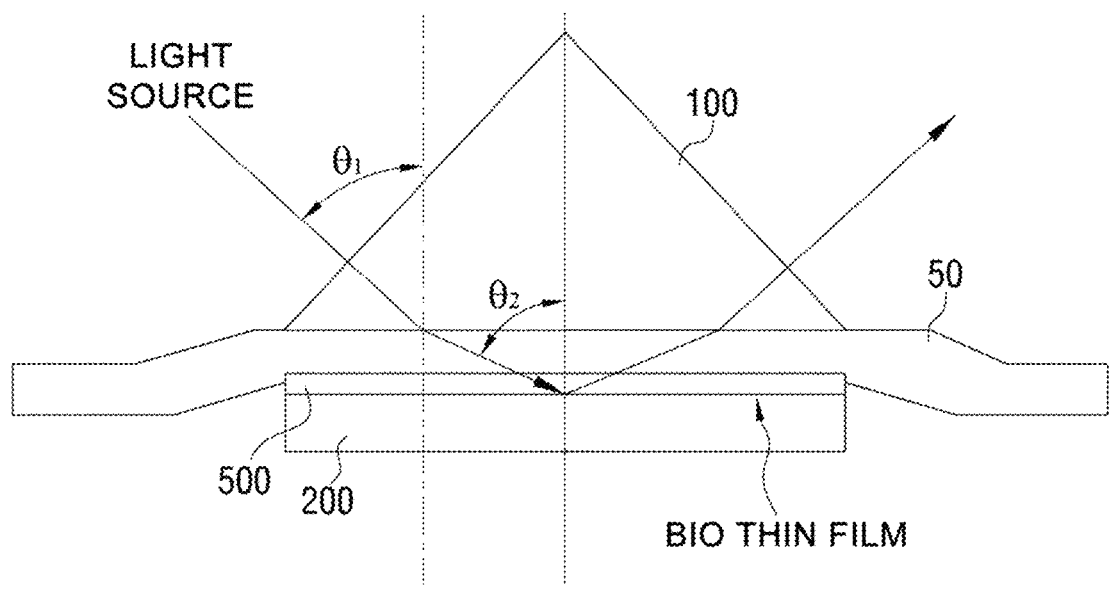

[FIG. 4]
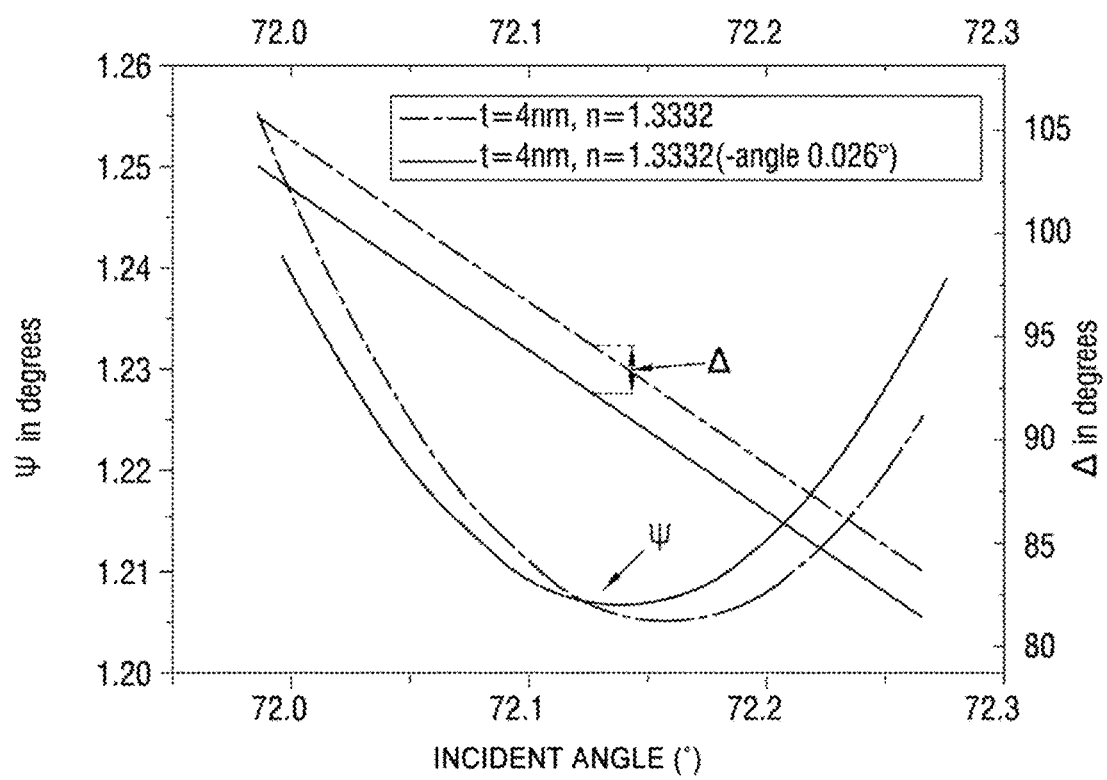

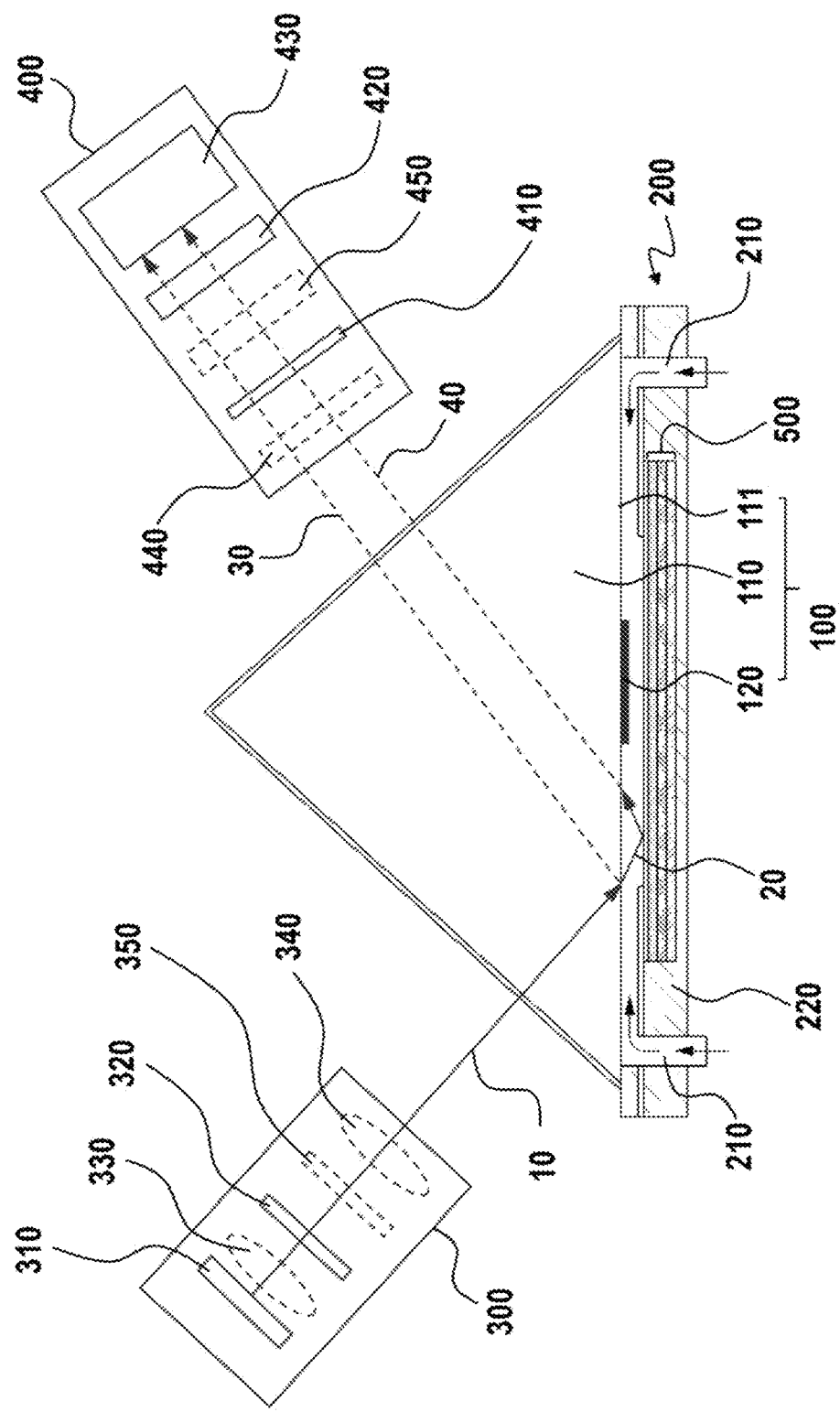
[FIG. 5]

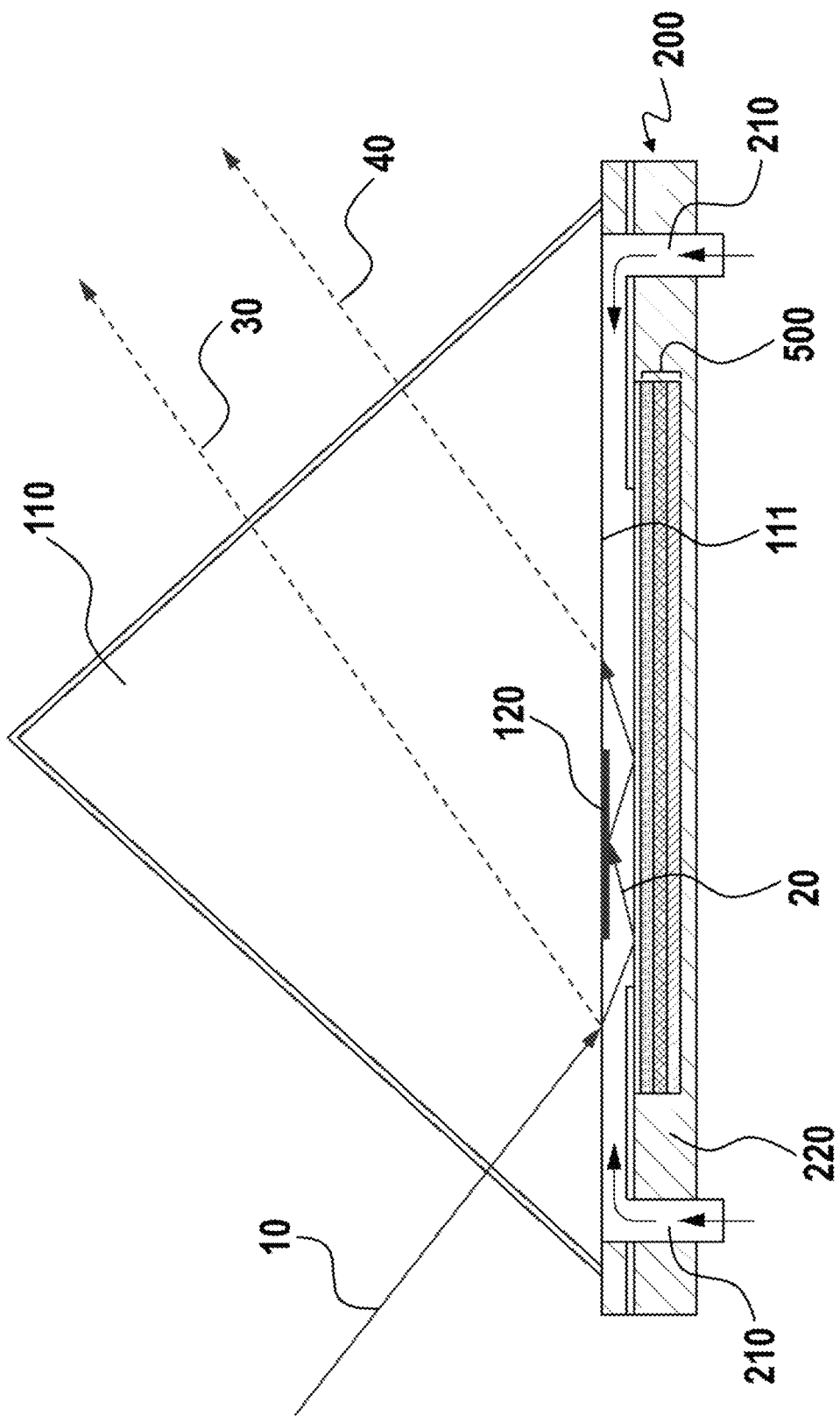
[FIG. 6]

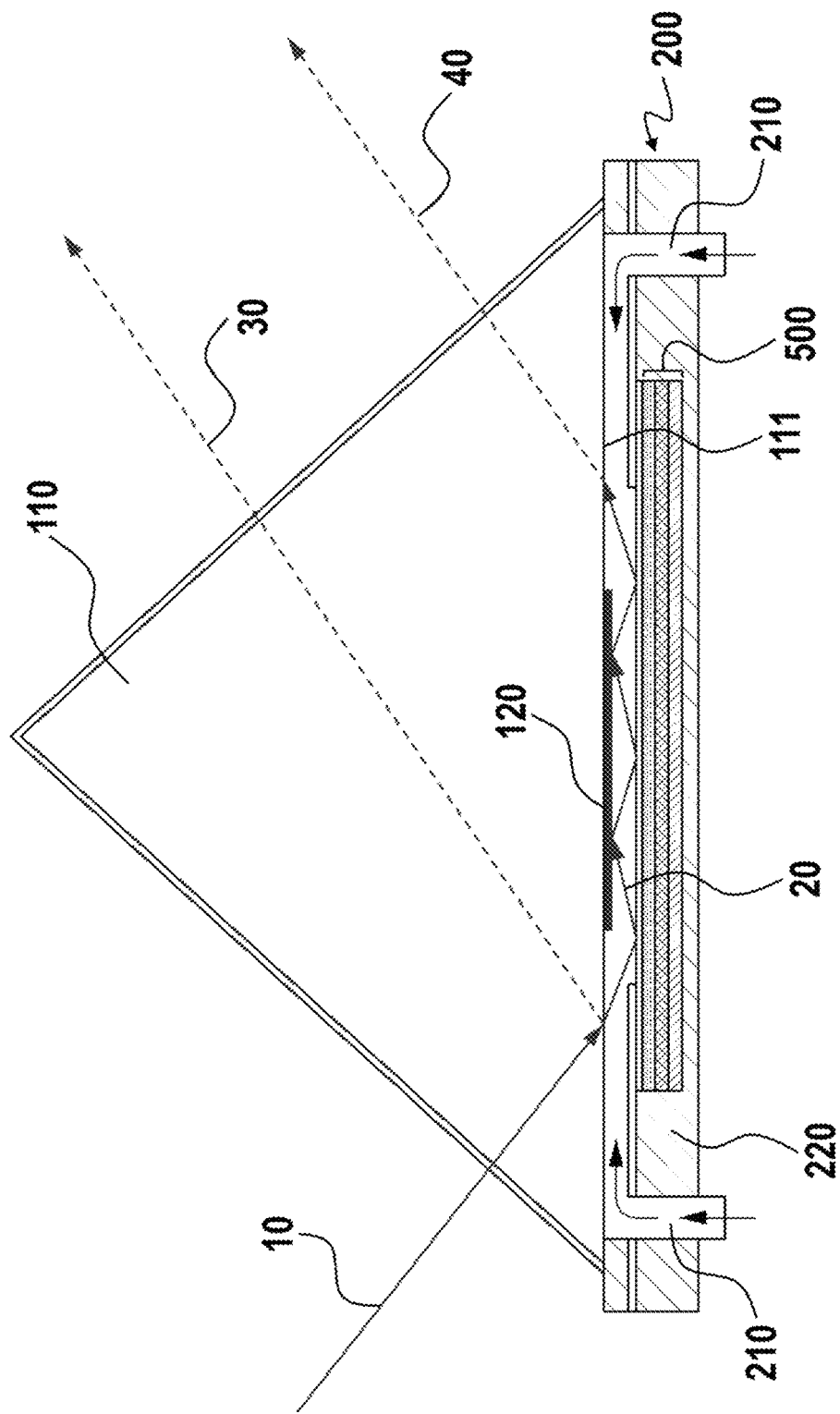
[FIG. 7]

[FIG. 8]
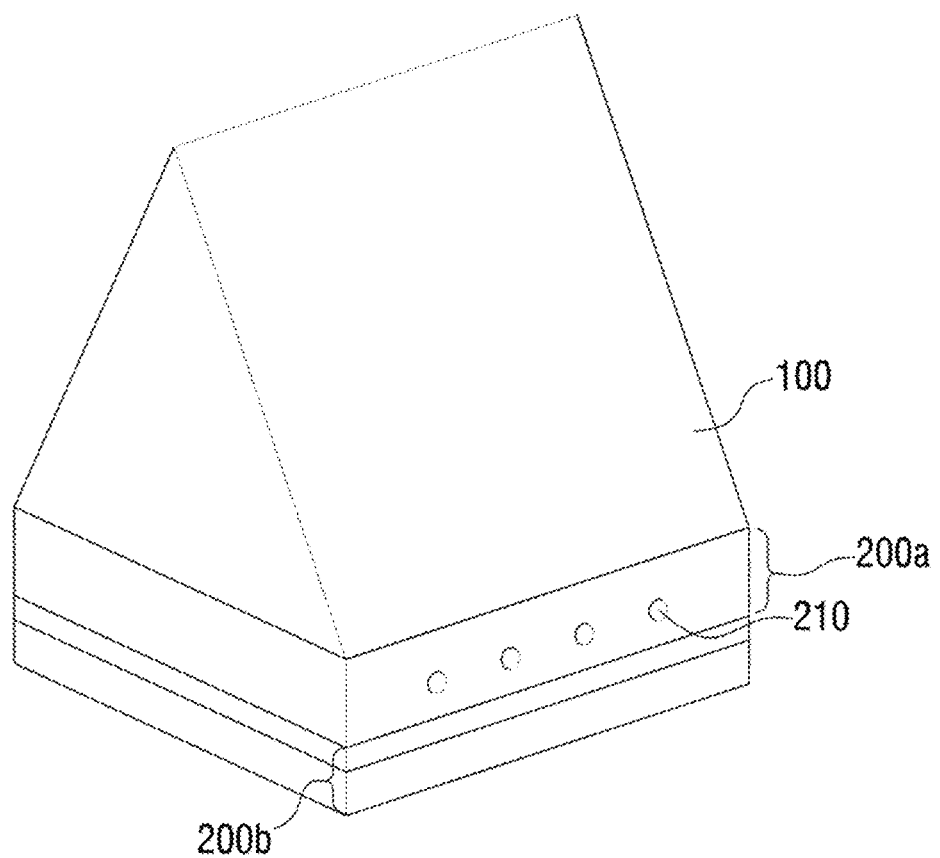

[FIG. 9]
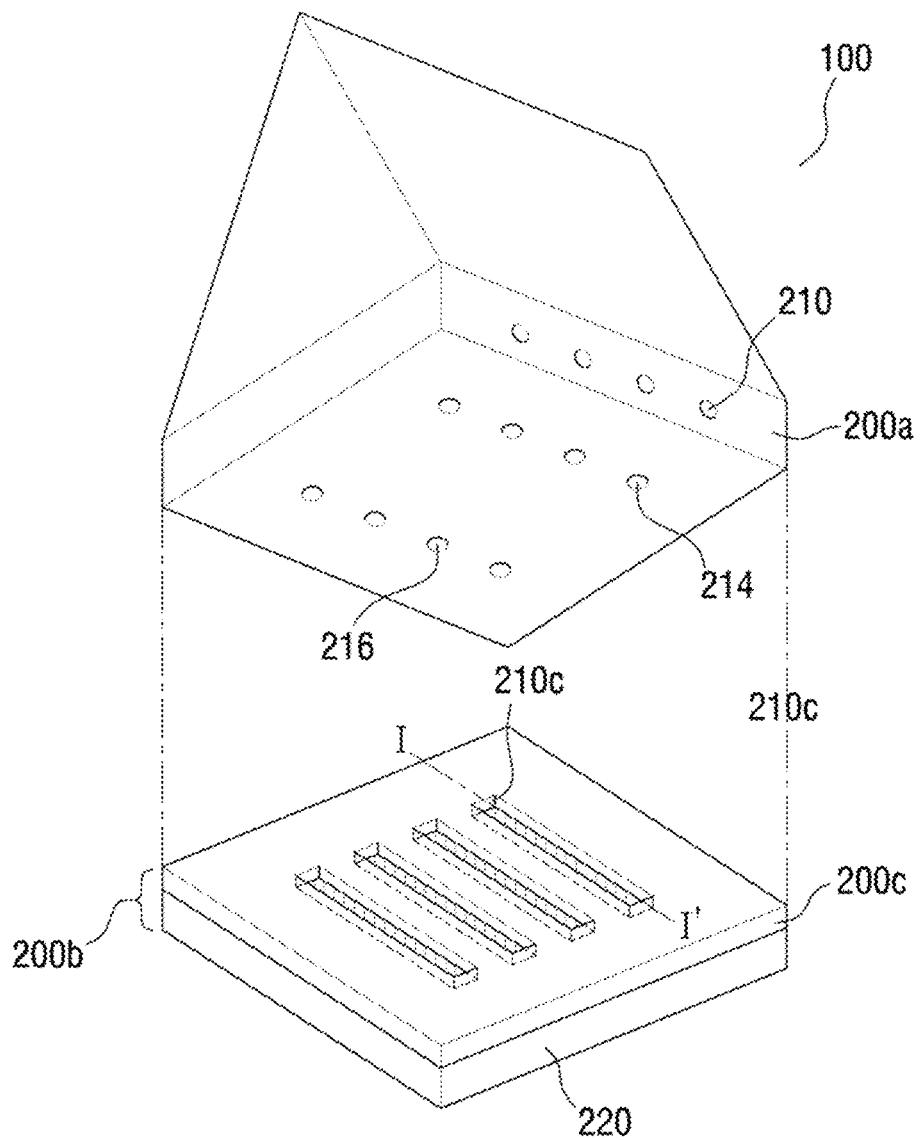

[FIG. 10]
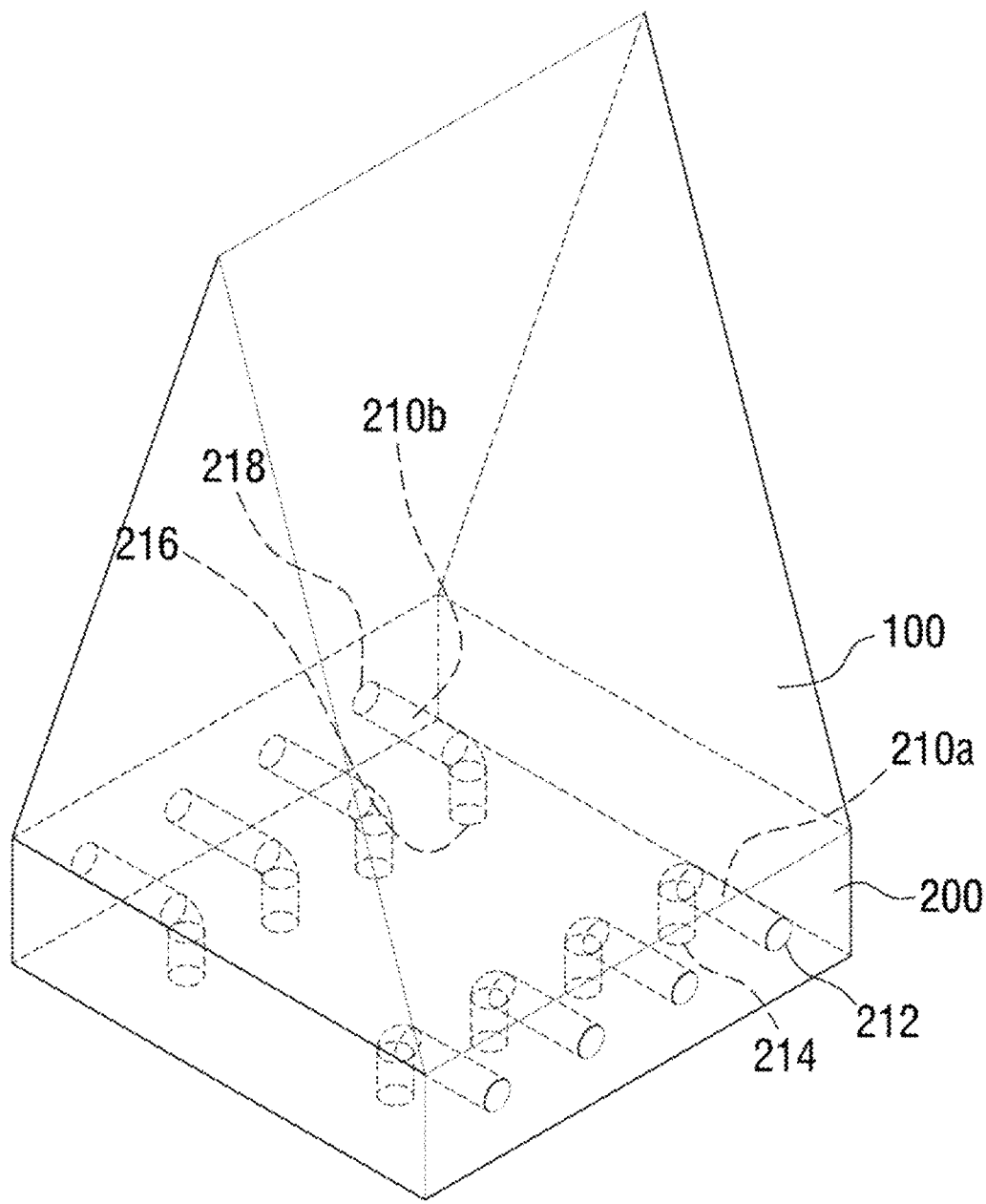

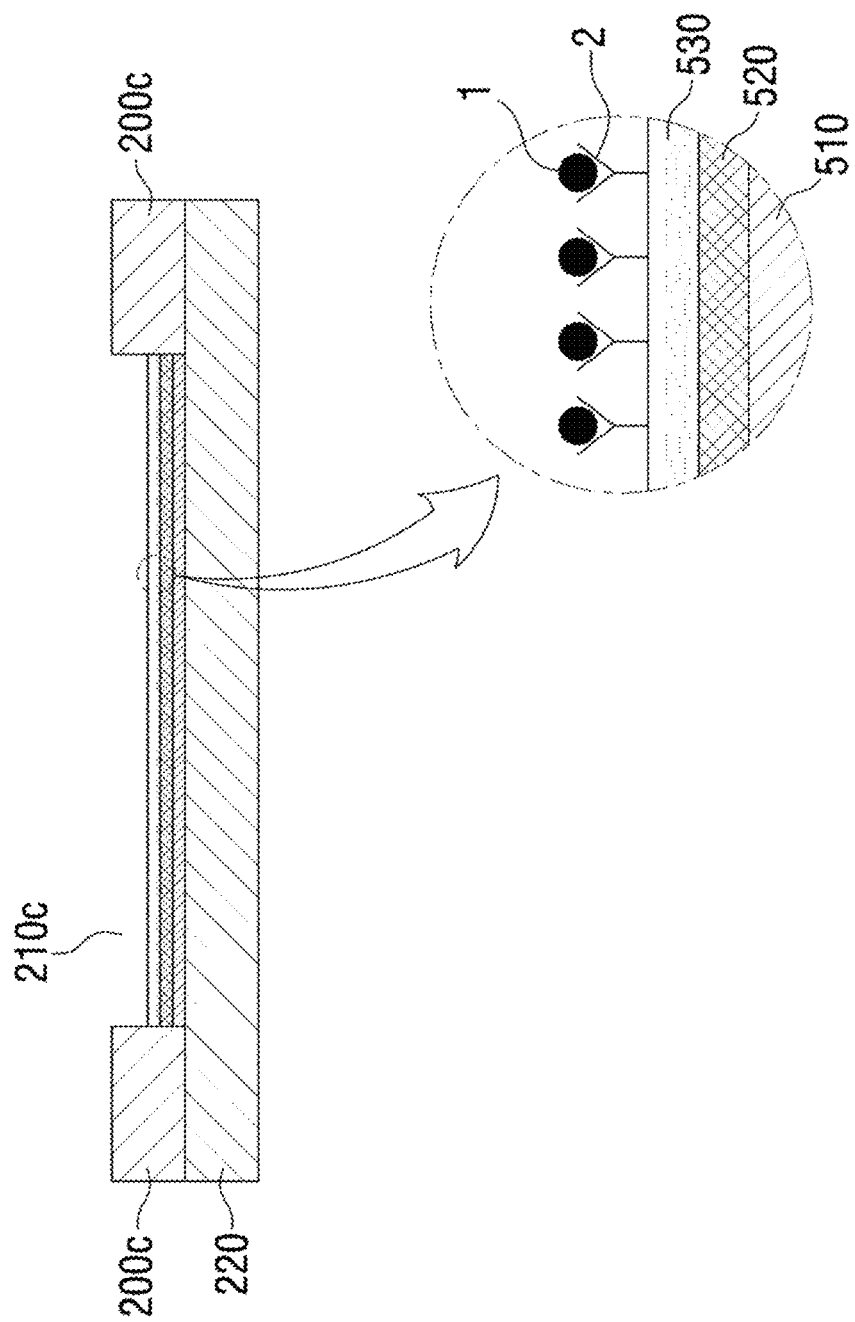
[FIG. 11]

[FIG. 12]
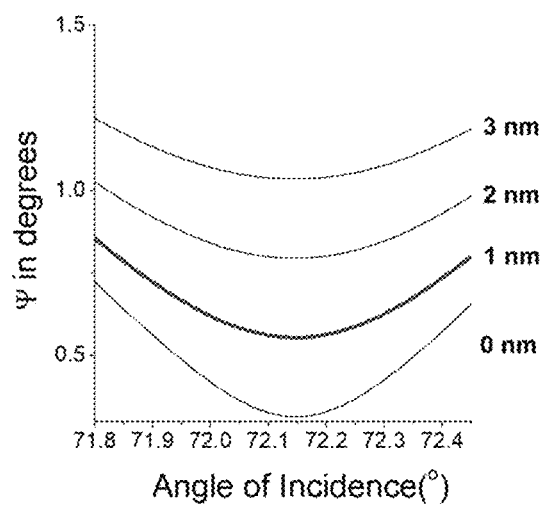
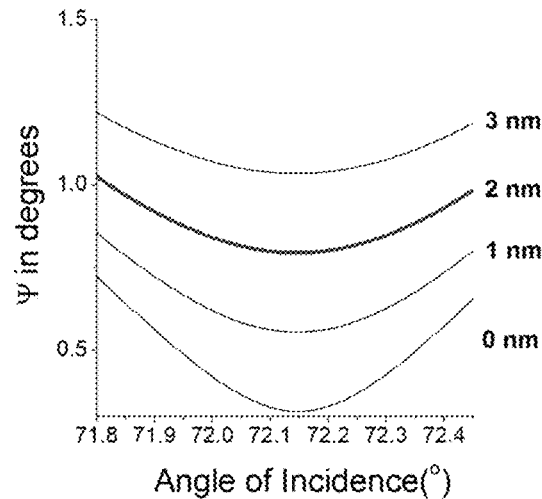
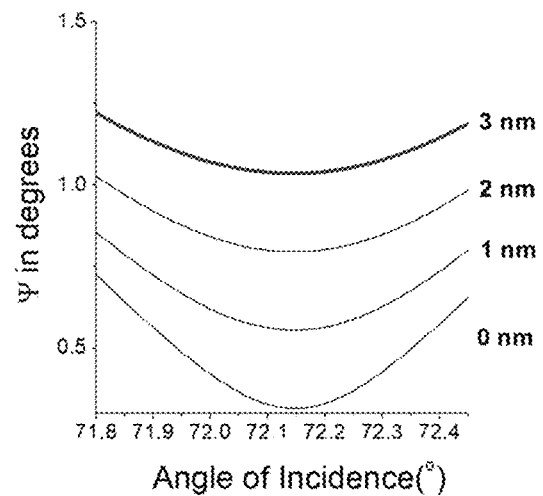

[FIG. 13]
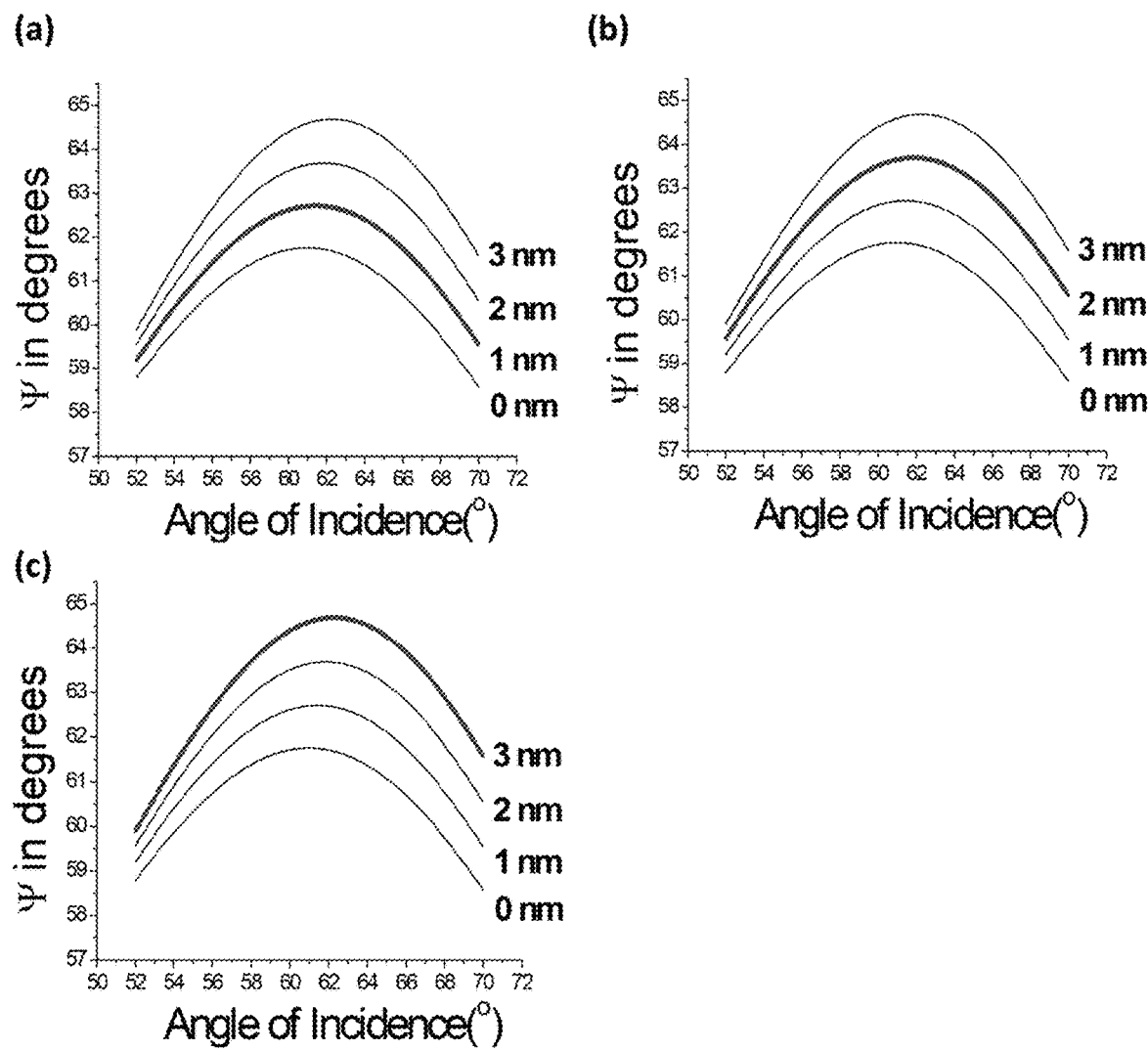

DEVICE AND METHOD FOR MULTI-REFLECTION SOLUTION IMMERSED SILICON-BASED MICROCHANNEL MEASUREMENT

TECHNICAL FIELD

The present disclosure relates to a multi-reflection silicon-based liquid immersion micro-channel measurement device and measurement method, and more particularly, to a multi-reflection silicon-based liquid immersion micro-channel measurement device and measurement method capable of improving measurement sensitivity by completely separating, through multi-reflection, first reflective light reflected by a sample detection layer and a second reflective light by a prism-buffer solution interface and by allowing the light to enter multiple times through the multi-reflection.

BACKGROUND ART

Reflectometry and ellipsometry are optical analysis techniques which measure a change of the reflectance or a polarization state of reflected light reflected from a surface of a sample and analyze the measured value to find a thickness and optical properties of the sample.

Measurement equipment using the same includes a reflectometer and an ellipsometer. The measurement equipment is utilized to evaluate thicknesses and physical properties of various nano-level thin films during a process of manufacturing a nano-thin film in a semiconductor industry. Further, efforts are continuing to expand an application range to a bio-industry to apply them to interface analysis of biomaterials such as proteins, DNA, viruses, and new drug materials.

The reflectometer of the related art is sufficient to evaluate a thickness and a physical property of a nano-thin film having a size of several nanometers (nm) or larger. However, there is a problem in that measurement sensitivity for analyzing a low molecular weight biomaterial requiring sensitivity in the range of approximately 1 to 0.001 nanometer is low so that the reliability is degraded. As compared with the reflectometer, the ellipsometer has measurement sensitivity of 0.01 nm or lower. Particularly, the measurement sensitivity is high in the condition that the refractive index is comparatively large as in the case of measuring the thickness of the oxide film having a relatively small refractive index as compared with the semiconductor on the high refractive index semiconductor substrate.

However, in order to analyze the low molecular biomaterial using the ellipsometer, a measurement method with improved sensitivity is required.

As a technique of the related art for improvement of the measurement sensitivity at the time of analyzing the biomaterial, a surface plasmon resonance sensor (hereinafter, referred to as an "SPR" sensor) in which reflectometry and a surface plasmon resonance technique are combined is known.

The surface plasmon resonance (SPR) phenomenon is known as a phenomenon that when electrons on a metal surface are excited by light waves to be collectively vibrated in a normal direction of the surface, light energy is absorbed at this time. It is known that the SPR sensor can not only measure the thickness and the refractive index change of the nano-thin film which is in contact with the metal surface using the surface plasmon resonance phenomenon sensitive to a polarization characteristic of the light, but also measure the change of an adsorption concentration of a biomaterial in a real time in a non-labeling manner which does not use a fluorescent material.

The SPR sensor is manufactured to have a structure in which a metal thin film of several tens of nanometers is coated on a material such as glass and a biomaterial can be bonded thereto and uses a principle that when a sample dissolved in a buffer solution is bonded to the sensor, a resonance angle is changed. The resonance angle is obtained by measuring the reflectance. When light is incident onto the SPR sensor, the glass material serves as an incident medium and the light passes through a thin film layer to which the biomaterial is bonded so that the buffer solution finally serves as a substrate.

With this structure, a refractive index of the buffer solution corresponding to the substrate material directly affects the shift of the resonance angle as well as the change of the biological thin film layer by the adhesion of the sample to be measured. Therefore, in order to measure only pure binding kinetics, the refractive index of the buffer solution needs to be independently measured and corrected.

In order to correct the change of the refractive index of the buffer solution and prevent the error due to the diffusion between the sample and the buffer solution, a method of correcting the error using a delicate valve device, an air injecting device, and two or more channels in which one is used as a reference channel has been used. However, it is difficult to distinguish the SPR angle change due to the change of the refractive index of the buffer solution from an SPR angle change due to the pure adsorption and dissociation characteristic, and this may always act as a factor causing a measurement error. Consequently, due to the limitation of the measurement method as described above, the SPR sensor of the related art has a fundamental difficulty in measuring the adsorption and dissociation characteristic of a material having a small molecular weight such as a small molecule.

Further, the SPR sensor of the related art uses a metal thin film of precious metal such as gold (Au) and silver (Ag) for surface plasmon resonance so that the manufacturing cost of the sensor is expensive. Further, the metal thin film has problems in that the surface roughness is uneven in accordance with the manufacturing process so that the variation of the refractive index is severe, it is difficult to quantitatively measure the biomaterial due to the unstable optical property, and errors caused by different sensitivity characteristics of different positions are included as relatively compared with the reference channel.

In order to improve the disadvantages of the SPR sensor, when a biomaterial adhesive sensor layer is formed on a substrate material such as silicon and an amplitude and a phase of light which passes through a buffer solution under a liquid immersion micro-channel environment to be reflected onto the substrate material are measured by the ellipsometry under a p-polarized wave non-reflection condition, a signal that the measured amplitude is insensitive to the change of the refractive index of the buffer solution but is sensitive to the binding kinetics of the biomaterial may be obtained. When the junction characteristic of the biomaterial adsorbed onto the substrate material under the liquid immersion micro-channel environment is measured, contrary to the SPR measurement, the buffer solution serves as an incident medium and light which passes through the biomaterial adsorption layer is reflected from the substrate material.

Under this measurement condition, a measured ellipsometric angle $\Psi$ indicating the measured amplitude is insensitive to the change of the refractive index of the incident medium which is a buffer solution, but is sensitive only to the change of the bio thin film and the substrate material. In the case of a substrate having a stable refractive index, such as silicon, the measured ellipsometric angle Ψ obtains a signal which is sensitive only to the change of the bio thin film. In a case in which a prism incident structure illustrated in FIG. 1 is used, an ellipsometric angle Δ indicating a phase represents a signal which is sensitive only to the refractive index of the buffer solution so that the thickness of the bio thin film and the refractive index of the buffer solution may be simultaneously measured. However, when using a substrate parallel to a planar incidence structure such as a prism, the light reflected from the interface between the prism and the buffer solution needs to be removed and only the light reflected from the substrate needs to be used. In order to minimize a usage amount of the sample, the interval between a prism surface and the substrate material needs to be reduced. In this case, two reflected light are located to be very close, so that it is difficult to separate the light and the light serves as a measurement error. Therefore, a measurement method with a new structure for distinguishing light reflected from the interface between the prism and the buffer solution in a planar incident structure such as a prism from light reflected from the substrate material including a sensor is required.

FIG. 1 is a cross-sectional view illustrating a sensor for measuring a junction characteristic of a biomaterial according to a prior patent. As illustrated in FIG. 1, a biomaterial junction characteristic sensor according to the prior patent is approximately configured by a prism 100, a micro-channel structure 200, a polarized light generating unit 300, and a polarized light detecting unit 400. In this case, the micro-channel structure 200 of the biomaterial junction characteristic sensor according to the prior patent disposes an adsorption layer 530 on a substrate 510 or a dielectric thin film 520 to form a liquid immersion micro-channel 210 environment. In this case, when the buffer solution 50 in which a sample 1 of the biomaterial is dissolved is injected into the micro-channel 210, the biomaterial is adsorbed onto a ligand 2 material formed on a surface of the adsorption layer 530 to form an adsorption layer having a predetermined thickness.

The polarized incident light generated from the polarized light generating unit 300 is incident onto the interface of the buffer solution 50 and the substrate 510 via an incident surface 110 of the prism at an angle which causes the p-polarized wave non-reflection condition. In this case, the reflected light reflected from the substrate 510 includes optical data on the refractive index of the adsorption layer of the sample 1 and the buffer solution. That is, when the sample 1 is adsorbed onto or dissociated from the ligand 2, a molecular binding and dissociation kinetics such as an adsorption concentration, a thickness or a refractive index of the adsorption layer, or a refractive index of the buffer solution is changed and thus the measured ellipsometric angles vary. Further, the reflected light including the optical data is detected by the polarized light detecting unit 400. In this case, the polarized light detecting unit 400 measures the change in accordance with a polarized component of the reflected light, that is, the ellipsometric angles, to figure out the molecular binding and dissociation kinetics of the sample 1 and the refractive index of the buffer solution.

FIG. 2 illustrates an adsorption curve indicating a process of adsorbing the sample 1 onto the metal thin film 30 and a dissociation curve indicating a dissociating process. The larger the association rate constant ka, the faster the adsorption of the biomaterial and the smaller the dissociation rate constant kd, the slower the dissociation.

That is, the association rate constant and the dissociation rate constant are measured to calculate a dissociation constant (KD=kd/ka) in an equilibrium state. For example, it is possible to determine whether a new drug candidate material having a low molecular weight which may be used as a carcinogenesis inhibitor can be used as a new drug by measuring a characteristic of the new drug candidate material which is associated onto or dissociated from a protein including a carcinogen-inducing factor.

Hereinafter, the characteristic and the limitation of the biomaterial analysis sensor according to the prior art will be described with reference to FIGS. 3 and 4. When the light is incident using a prism incident structure as illustrated in FIG. 3, the light is incident onto the interface at an inclined angle of approximately 72.14° (=θ2) and when the light is incident from the prison onto the buffer solution by the refractive index change (0.0002) of the buffer solution, the angle change may be approximately −0.026°. The p-polarized wave non-reflection condition is approximately θ2=72.14°. However, the current angle due to the change of the refractive index of the buffer solution is changed to 72.114° which is 0.026° smaller. Therefore, as illustrated in FIG. 4, a graph of Ψ and Δ is represented and non-reflection angle of the p-polarized wave is hardly changed in accordance with the change of the refractive index so that values of Ψ and Δ may be measured at 72.114° which is 0.026° smaller.

In FIG. 4, in a solid line graph when the buffer solution 50 has different refractive indexes, the refractive index of the buffer solution 50 is 1.3330 and the dotted line graph corresponds to the refractive index 1.3332 of the buffer solution 50. By the change of the refractive index of the buffer solution when the prism structure is used, the change of the Ψ value is hardly represented, as illustrated in FIG. 4. However, Δ exhibits a large change. The ellipsometric constant Δ for a phase difference is sensitively changed only by the change of the refractive index of the buffer solution but is hardly affected by the junction characteristic, so that only the change of the refractive index of the buffer solution may be measured with high sensitivity. The smaller the thickness of the thin film material, the larger the change of the ellipsometric constant Δ. When the change of the refractive index is measured to be applied for an application study to analyze the change of the physical property or the junction characteristic of the material, it is possible to measure the refractive index with ultra-high sensitivity as compared with the SPR measurement method of the related art.

When a buffer solution which is continuously supplied and a buffer solution in which a refractive index is changed due to the solvent used for the sample are supplied to the sensor through a micro-channel, the pure binding kinetics and the change of the refractive index of the buffer solution may be simultaneously measured.

However, as illustrated in FIG. 3, when the interval between a bottom surface of the prism and the substrate material is small, it is difficult to separate light reflected from the interface of the prism and the buffer solution from light reflected from the substrate material. Since, it is measured under the p-polarized wave non-reflection condition, there may be a problem in that a measurement error is caused due to intensity of the light reflected from the substrate material weaker than that of the light reflected from the prism and the buffer solution interface. Further, there may occur additional problems in that supersensitivity is required, and measurement sensitivity needs to be improved at the time of measuring extremely low concentration of a material contained in a medium in air.

DOCUMENTS OF RELATED ART

Patent Documents

Korean Patent No. 10-1105328
Korean Patent No. 10-1383652

DISCLOSURE

Technical Problem

An object of the present disclosure for solving the above-mentioned problems is to provide a multi-reflection silicon-based liquid immersion micro-channel measurement device and measurement method capable of performing high-sensitivity measurement by completing separating, through multi-reflection, first reflective light reflected by a sample detection layer and second reflective light reflected by a prism-buffer solution interface.

Another object of the present disclosure is to provide a multi-reflection silicon-based liquid immersion micro-channel measurement device capable of improving measurement sensitivity by allowing light to enter a sample multiple times through multi-reflection.

Still another object of the present disclosure is to provide a multi-reflection silicon-based liquid immersion micro-channel measurement device and measurement method capable of providing various experiment conditions by minimizing a height of a channel, providing a micro-channel having a multi-channel, and changing a concentration of sample and then injecting the sample or changing an adsorption degree of self-assembled monolayer film in order to minimize the consumption of the sample.

Yet another object of the present disclosure is to provide a multi-reflection silicon-based liquid immersion micro-channel measurement device and measurement method capable of measuring a bioadhesive material in a non-labeled manner at high sensitivity under a liquid immersion micro-channel environment and thus being widely utilized in various industries such as biological, medical, food, and environmental industries.

Technical problems to be solved by the present disclosure are not limited to the above-mentioned technical problems, and other technical problems, which are not mentioned above, may be clearly understood from the following descriptions by those skilled in the art to which the present disclosure pertains.

Technical Solution

To achieve the above-mentioned objects, the present disclosure provides a multi-reflection liquid immersion silicon-based micro-channel measurement device including: a micro-channel structure including a support, and one or more micro-channels formed on the support and each of the one or more micro-channels including a sample detection layer with a fixed bioadhesive material for detecting a sample; a sample injection unit configured to inject a buffer solution containing the sample into the micro-channel; a prism unit including a prism, and a reflection structure formed by coating a bottom surface of the prism with a mirror reflection material; a polarized light generating unit configured to generate polarized light; and a polarized light detecting unit configured to detect a polarization change of reflected light, in which the polarized light passes through the prism to define incident light that enters a prism-buffer solution interface that adjoins the prism and the buffer solution, in which a part of the incident light is reflected by the prism-buffer solution interface and then passes through the prism to define first reflected light, in which another part of the incident light passes through the prism-buffer solution interface, performs multi-reflection by repeatedly performing reflection and light incidence multiple times by the sample detection layer and the reflection structure, and then passes through the prism to define second reflected light, and in which the first reflected light and the second reflected light are spatially and completely separated by the multi-reflection.

In the embodiment of the present disclosure, another part of the incident light may pass through the buffer solution to define transmitted light that enters the sample detection layer at an incident angle that satisfies a p-polarized wave non-reflection condition, and the transmitted light may be reflected by the sample detection layer, be mirror-reflected by the reflection structure at the prism-buffer solution interface, perform multi-reflection by repeatedly performing reflection and light incidence multiple times, and then passes through the prism to define second reflected light.

In the embodiment of the present disclosure, the sample detection layer may include: a substrate, a dielectric thin film formed on the substrate; and an adsorption layer formed on the dielectric thin film, and the bioadhesive material for detecting the sample may be fixed to the adsorption layer.

In the embodiment of the present disclosure, when light is reflected by the sample multiple times through the multi-reflection and reflectance of the non-reflection of the p-polarized wave deteriorates, a thickness of the dielectric thin film may increase to prevent a deterioration in signal intensity of the transmitted light.

In the embodiment of the present disclosure, when light is reflected by the sample multiple times through the multi-reflection and reflectance of the p-polarized wave non-reflection deteriorates, the transmitted light, which enters the sample detection layer at an incident angle that satisfies an s-polarized wave non-reflection condition, may be formed to prevent a deterioration in signal intensity of the transmitted light.

In the embodiment of the present disclosure, the substrate may be made of one or more materials selected from silicon, a dielectric material, or a semiconductor.

In the embodiment of the present disclosure, the polarized light detecting unit may calculate a thickness or concentration of the sample adsorbed to the adsorption layer based on a polarization change of the second reflected light.

In the embodiment of the present disclosure, the polarized light generating unit may adjust a light amount of the incident light entering the prism and control a shape of a beam spot of the incident light formed on the prism-buffer solution interface.

In the embodiment of the present disclosure, the sample injection unit may inject gas, instead of the buffer solution, into the micro-channel to measure a biomarker contained in air or the gas.

In the embodiment of the present disclosure, when the gas is injected into the micro-channel, the polarized light may pass through the prism to define incident light that enters a prism-gas interface that adjoins the prism and the gas, and a part of the incident light may be reflected by the prism-gas interface and then pass through the prism to define the first reflected light.

To achieve the above-mentioned object, the present disclosure provides a measurement method, which uses the multi-reflection liquid immersion silicon-based micro-channel measurement device according to claim 1, the measurement method including: a first step of injecting, by the sample injection unit, the buffer solution into the micro-channel structure including the one or more micro-channels, each of the one or more micro-channels including the sample detection layer with the fixed bioadhesive material for detecting the sample; a second step of adsorbing the sample contained in the buffer solution to an antibody of the sample detection layer; a third step of generating, by the polarized light generating unit, polarized light; a fourth step of allowing the polarized light to pass through the prism to define incident light that enters the prism-buffer solution interface that adjoins the prism and the buffer solution; a fifth step of allowing a part of the incident light is reflected by the prism-buffer solution interface to define the first reflected light that passes through the prism and allowing another part of the incident light to pass through the buffer solution to define transmitted light that enters the sample detection layer at an incident angle that satisfies a polarized wave non-reflection condition; a sixth step of allowing the transmitted light to be reflected at the sample detection layer and mirror-reflected by the reflection structure at the prism-buffer solution interface so as to perform multi-reflection by repeatedly performing reflection and light incidence multiple times, and then allowing the transmitted light to pass through the prism to define second reflected light; a seventh step of detecting, by the polarized light detecting unit, a polarization change of the second reflected light; and an eighth step of detecting a concentration of the sample adsorbed to the sample detection layer based on the polarization change of the second reflected light, in which the second reflected light and the first reflected light discharged to the outside of the prism unit are spatially and completely separated by the multi-reflection.

Advantageous Effect

According to the present disclosure, it is possible to solve the problems of the measurement method of the related art in that light reflected from the interface of the prism and the measurement medium has a higher energy than that of light reflected from the substrate material and is hardly separated therefrom, which may cause the measurement error. Further, it is possible to completely separate the light reflected by the interface between the prism and the measurement medium and the light reflected by the substrate material by applying the multi-reflection structure, thereby obtaining a signal amplifying effect implemented by the multi-reflection.

In addition, according to the present disclosure, it is possible to provide various experiment conditions by minimizing a height of a channel, providing a micro-channel having a multi-channel, and changing a concentration of sample and then injecting the sample or changing an adsorption degree of self-assembled monolayer film in order to minimize the consumption of the sample.

Further, the present disclosure may measure the bioadhesive material in a non-leveling manner under the liquid immersion micro-channel environment at high sensitivity and thus be widely utilized in various industries such as biological, medical, food, and environmental industries.

The effects of the present disclosure are not limited to the above-mentioned effects, and it should be understood that the effects of the present disclosure include all effects that may be derived from the detailed description of the present disclosure or the appended claims.

DESCRIPTION OF DRAWINGS

FIG. 1 is a cross-sectional view illustrating a sensor for measuring junction characteristics of a biomaterial according to the prior patent.

FIG. 2 is a schematic view illustrating a change in adsorption concentration during a process of adsorbing and dissociating a sample onto a metal thin film.

FIG. 3 is a schematic view of a liquid immersion micro-channel measurement sensor based on a prism incident-type silicon for explaining problems in the related art.

FIG. 4 is a graph obtained by measuring ellipsometric constants $\Psi$ and $\Delta$ according to adsorption of a biomaterial and a change in refractive index of a buffer solution using the sensor for measuring junction characteristics of a biomaterial according to the prior patent.

FIG. 5 is a schematic view of a micro-channel measurement device according to an embodiment of the present disclosure from which a reflection structure is removed.

FIGS. 6 and 7 are schematic views of the micro-channel measurement device according to the embodiment of the present disclosure in which the reflection structure is provided.

FIG. 8 is a perspective view of the micro-channel measurement device according to the embodiment of the present disclosure.

FIG. 9 is an exploded perspective view of the micro-channel measurement device according to the embodiment of the present disclosure.

FIG. 10 is a transparent view illustrating a prism unit and a first structure according to the embodiment of the present disclosure.

FIG. 11 is a cross-sectional view illustrating a second structure according to the embodiment of the present disclosure.

FIG. 12 is a graph illustrating a change in amplitude of second reflective light in accordance with the number of reflection of transmitted light implemented by p-polarized waves according to the embodiment of the present disclosure.

FIG. 13 is a graph illustrating a change in amplitude of the second reflective light in accordance with the number of reflection of the transmitted light implemented by s-polarized waves according to the embodiment of the present disclosure.

BEST MODE

The best embodiment of the present disclosure provides a multi-reflection liquid immersion silicon-based micro-channel measurement device including: a micro-channel structure including a support, and one or more micro-channels formed on the support and each having a sample detection layer with a fixed bioadhesive material for detecting a sample; a sample injection unit configured to inject a buffer solution containing the sample into the micro-channel; a prism unit including a prism, and a reflection structure formed by coating a bottom surface of the prism with a mirror reflection material; a polarized light generating unit configured to generate polarized light; and a polarized light detecting unit configured to detect a polarization change of reflected light, in which the polarized light passes through the prism to define incident light that enters a prism-buffer solution interface that adjoins the prism and the buffer solution, in which a part of the incident light is reflected by the prism-buffer solution interface and then passes through the prism to define first reflected light, in which another part of the incident light passes through the prism-buffer solution interface, performs multi-reflection by repeatedly performing reflection and light incidence multiple times by the sample detection layer and the reflection structure, and then passes through the prism to define second reflected light, and in which the first reflected light and the second reflected light are spatially and completely separated by the multi-reflection.

Mode for Invention

Hereinafter, the present disclosure will be described with reference to the accompanying drawings. However, the present disclosure may be implemented in various different ways and is not limited to the embodiments described herein. Further, a part irrelevant to the description will be omitted in the drawings in order to clearly describe the present disclosure, and similar constituent elements will be designated by similar reference numerals throughout the specification.

Throughout the present specification, when one constituent element is referred to as being "connected to (coupled to, in contact with, or linked to)" another constituent element, one constituent element can be "directly connected to" the other constituent element, and one constituent element can also be "indirectly connected to" the other element with other elements interposed therebetween. In addition, unless explicitly described to the contrary, the word "comprise/include" and variations such as "comprises/includes" or "comprising/including" will be understood to imply the inclusion of stated elements, not the exclusion of any other elements.

The terms used in the present specification are used to just describe a specific embodiment and do not intend to limit the present disclosure. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Configuration of First Embodiment

Hereinafter, the present disclosure will be described in detail with reference to the accompanying drawings.

FIG. 5 is a schematic view of a micro-channel measurement device according to an embodiment of the present disclosure from which a reflection structure 120 is removed, and FIGS. 6 and 7 are schematic views of the micro-channel measurement device according to the embodiment of the present disclosure in which the reflection structure 120 is provided. In this case, FIG. 5 is a view illustrating a state in which transmitted light 20 is not reflected by the reflection structure 120. FIG. 6 is a view illustrating a state in which the transmitted light 20 is reflected by the reflection structure 120 once. FIG. 7 is a view illustrating a state in which the transmitted light 20 is reflected by the reflection structure 120 twice. FIGS. 6 and 7 do not illustrate a polarized light generating unit 300 and a polarized light detecting unit 400. However, in the case of FIGS. 6 and 7, the polarized light generating unit 300 and the polarized light detecting unit 400 are, of course, installed, as illustrated in FIG. 5.

In addition, FIG. 8 is a perspective view of the micro-channel measurement device according to the embodiment of the present disclosure, and FIG. 9 is an exploded perspective view of the micro-channel measurement device according to the embodiment of the present disclosure.

Further, FIG. 10 is a transparent view illustrating a prism unit 100 and a first structure 200*a* according to the embodiment of the present disclosure, and FIG. 11 is a cross-sectional view illustrating a second structure 200*b* according to the embodiment of the present disclosure.

As illustrated in FIGS. 5 to 11, a micro-channel 210 measurement device according to the present disclosure includes: a micro-channel structure 200 including a support 220, and one or more micro-channels 210 formed on the support 220 and each of the one or more micro-channels including a sample detection layer 500 with a fixed bioadhesive material for detecting a sample 1; a sample 1 injection unit configured to inject a buffer solution 50 containing the sample 1 into the micro-channel 210; a prism unit 100 including a prism 110, and a reflection structure 120 formed by coating a bottom surface of the prism 110 with a mirror reflection material; the polarized light generating unit 300 configured to generate polarized light; and the polarized light detecting unit 400 configured to detect a polarization change of reflected light.

In this case, the polarized light may pass through the prism 110 to define incident light 10 that enters a prism-buffer solution interface 111 that adjoins the prism 110 and the buffer solution 50. A part of the incident light 10 may be reflected by the prism-buffer solution interface 111 to define first reflected light 30 that passes through the prism 110. Another part of the incident light 10 may pass through the buffer solution 50 to define transmitted light 20 that enters the sample detection layer 500 at an incident angle that satisfies a polarized wave non-reflection condition. The transmitted light 20 may be reflected by the sample detection layer 500 and mirror-reflected by the reflection structure 120 at the prism-buffer solution interface 111, and the transmitted light 20 may perform multi-reflection by repeatedly performing the reflection and light incidence multiple times, then pass through the prism 110 to define second reflected light 40.

Further, the first reflected light 30 and the second reflected light 40, which are discharged to the outside of the prism unit 100, may be spatially and completely separated by the multi-reflection. The above-mentioned operation will be described below in detail.

The embodiment of the present disclosure measures the binding and dissociation kinetics of a bioadhesive material including a low molecular weight material using ellipsometry and has a structure in which a buffer solution (buffer) 50 including a sample (not illustrated) of a bioadhesive material is injected into a micro-channel structure 200. In this case, the micro-channel 210 in the micro-channel structure 200 may be configured by a multi-channel.

Optical glass may be mainly used as the prism 110. For example, the prism may be BK7 or SF10, but the present disclosure is not limited thereto. In addition, the prism 110 may be configured by assembling a plurality of unit prisms.

The reflection structure 120 may be a coating layer mirror-applied onto the bottom surface of the prism 110. The reflection structure 120 may reflect the transmitted light 20 that propagates toward the reflection structure 120. Further, a length of the reflection structure 120 may vary depending on the number of reflection of the transmitted light.

When the number of reflection of the transmitted light increases as the length of the reflection structure 120 (a length in a propagation direction of the transmitted light 20) increases, an interval between the first reflected light 30 and the second reflected light 40 increases, and performance in spatially separating the first reflected light 30 and the second reflected light 40 may be improved, such that the second reflected light 40 may be more easily measured. However, when the number of reflection of the transmitted light 20 increases, the reflectance may deteriorate as the light is reflected by the sample 1 multiple times. Therefore, the length of the reflection structure 120 may be set in consideration of a change in reflectance of the transmitted light 20.

As described above, when reflectance of the p-polarized wave non-reflection deteriorates because the light is reflected by the sample 1 multiple times through multi-reflection, a thickness of the dielectric thin film 520 is increased to prevent a deterioration in signal intensity of the transmitted light 20. When the thickness of the dielectric thin film 520 increases, the reflectance rapidly increases as the thickness of the thin film increases to several nanometers to several hundreds of nanometers. Therefore, the deterioration in signal intensity of the transmitted light 20 may be prevented even though the transmitted light 20 is reflected multiple times.

Further, when reflectance of the p-polarized wave non-reflection deteriorates because the light is reflected by the sample 1 multiple times through multi-reflection, the transmitted light 20, which enters the sample detection layer 500 at an incident angle that satisfies an s-polarized wave non-reflection condition, is formed, such that the deterioration in signal intensity of the transmitted light 20 may be prevented. In the s-polarized wave non-reflection condition, the signal is very large, unlike the p-polarized wave non-reflection condition. Therefore, it is possible to detect a large signal even though the light is reflected by the sample 1 multiple times through multi-reflection.

The micro-channel structure 200 is disposed below the prism unit 100 and includes the one or more micro-channels 210, each of the one or more micro-channels including the sample detection layer 500. A bioadhesive material for detecting a sample may be fixed to the sample detection layer 500.

Specifically, in the embodiment of the present disclosure, the micro-channel structure 200 may include the plurality of micro-channels 210 that are passageways through which the buffer solution 50 containing the sample 1 may flow in or out. In this case, a width of the micro-channel 210 may be approximately several millimeters or a micro-scale of 1 mm or less. In addition, the plurality of micro-channels 210 may each include an inflow passage 210a, a micro-flow channel 210c, and an outflow passage 210b. That is, the micro-channel 210 may be configured by connecting the inflow passage 210a, the micro-flow channel 210c, and the outflow passage 210b.

Meanwhile, the sample injection unit 600 may inject the buffer solution 50 containing the sample 1 into the micro-channel 210 or discharge the buffer solution 50.

The polarized light generating unit 300 may adjust the light amount of the incident light 10 entering the prism 110 and control a shape of a beam spot of the incident light 10 formed on the prism-buffer solution interface.

Specifically, the polarized light generating unit 300 may generate polarized light and include a light source 310 and a polarizer 320. In addition, the polarized light generating unit 300 may include a collimating lens 330, a focusing lens 340, or a first compensator 350.

The polarizer 320 and the first compensator 350 may be rotatably configured or another polarized light modulating unit may be further included. The incident light 10 may include both a polarized light component of the p-polarized wave and a polarized light component of the s-polarized wave. The polarizer 320 may be aligned with an angle close to the p-polarized wave in order to increase a signal-to-noise ratio (SNR). Particularly, ratios of the p-polarized wave and the s-polarized wave included in the second reflected light 40 received by the polarized light detecting unit 400 may be similar to each other. Therefore, it is possible to control the shape of the beam spot of the incident light 10 formed on the prism-buffer solution interface 111.

In the embodiment of the present disclosure, the incident light 10 may enter the sample detection layer 500 at an incident angle $\theta_1$ that satisfies the p-polarized wave non-reflection condition. A complex reflection coefficient ratio ($\rho$) in the ellipsometric equation may be represented by a ratio of a p-polarized wave reflection coefficient ratio (Rp) to an s-polarized wave reflection coefficient ratio (Rs), that is, $\rho=Rp/Rs$. The p-polarized wave non-reflection condition means a condition that the p-polarized wave reflection coefficient ratio (Rp) has a value close to 0. The p-polarized wave non-reflection condition may be similar to the surface plasmon resonance condition of the SPR sensor of the related art and may be a condition that the measurement sensitivity of the present disclosure is maximized.

Various types of lamps, light-emitting diodes (LEDs), solid-lasers, liquid-lasers, gas-lasers, and semiconductor laser diodes (LDs) including laser diodes, which emit monochromatic light or white light with an infrared, visible, or ultraviolet wavelength range, may be used as the light source 310. In addition, the light source 310 may include a structure which varies a wavelength depending on a structure of an optical system. In the meantime, an optical signal of reflected light may have relatively smaller intensity in the vicinity of the above-described p-polarized wave non-reflection condition. In this case, the high sensitivity measurement may be allowed by irradiating light at a high quantity using a laser having coherence to increase a signal-to-noise ratio.

The collimating lens 330 may receive the light from the light source 310 to provide parallel light to the polarizer 320. Further, the parallel light, which passes through the polarizer 320, is converged by the focusing lens 340 to increase a quantity of the incident light 10. Further, the first compensator 350 may serve to cause phase lag in the polarized component of the incident light 10.

The polarized light detecting unit 400 may calculate a thickness or concentration of the sample 1 adsorbed to the adsorption layer 530 based on a polarization change of the reflected light. Specifically, the polarized light detecting unit 400 may receive the second reflected light 40 and detect the polarization change of the second reflected light 40. The second reflected light 40 reflected by the adsorption layer 530 is received, such that the change in polarization state of the second reflected light 40 may be detected. The polarized light detecting unit 400 may include an analyzer 410, a photodetector 420, and a processor 430. In addition, the polarized light detecting unit 400 may include a second compensator 440 and a spectrometer 450.

The analyzer 410, which is a counterpart of the polarizer 320, has a polarizing plate to polarize again the second reflected light 40, thereby controlling a polarization degree of the reflected light or an orientation of a polarizing surface. Further, the analyzer 410 may be rotatably configured depending on the structure of the optical system or may be further provided with a polarization modulating unit which may perform phase change or elimination of polarized components.

The photodetector 420 may serve to detect the polarized second reflected light 40 to obtain optical data and convert the optical data into an electrical signal. In this case, the optical data may include information on the change of the polarized state of the second reflected light 40. The photodetector 420 may be a CCD-type solid state imaging element, a photomultiplier tube (PMT), or a silicon photodiode.

The processor 430 may receive the electrical signal from the photo detector 420 and deduct a measurement value. The processor 430 includes a predetermined interpretation program using reflectometry and ellipsometry so that the processor 430 extracts and interprets the optical data converted to the electrical signal to deduct measurement values such as an adsorption concentration of the sample, a thickness of the adsorption layer 160, an adsorption constant, a dissociation constant, and a refractive index. In this case, in order to improve the measurement sensitivity, the processor 430 may desirably deduct the measurement value by calculating the ellipsometric constants Ψ and Δ for the phase difference of the ellipsometry.

With the embedded interpretation program, the above-mentioned measurement may be performed by using reflectance measurement in addition to the ellipsometry in the p-wave or s-wave non-reflection condition in the micro-channel measurement device according to the present disclosure.

The second compensator 440 delays the phase of the polarized component of the reflected light to control the polarized component. The second compensator 440 may be rotatably configured or optionally include another polarization modulating unit.

The spectrometer 450 may be used when the light source 310 emits white light. The spectrometer may be used to resolve the reflected light and separate reflected light having a wavelength in a narrow band to send the separated reflected light to the photodetector 420. In this case, the photodetector 420 may be a two-dimensional image sensor such as a CCD-type solid state imaging element and may obtain optical data on distribution of the reflected light.

Hereinafter, the micro-channel structure 200 will be described in more detail.

As illustrated in FIGS. 8 and 9, the micro-channel structure 200 according to the present disclosure may include the first structure 200a and the second structure 200b.

In this case, the first structure 200a may be provided below the prism unit 100. In particular, in the embodiment of the present disclosure, the prism unit 100 and the first structure 200a may be integrated, but the present disclosure is not limited thereto. Further, the first structure 200a and the second structure 200b may be separated from each other, and the second structure 200b may include a micro-flow channel layer 200c.

Meanwhile, the first structure 200 may be made of a permeable material such as glass or a transparent synthetic resin material. In this case, an example of a synthetic resin material includes an acrylic resin such as polymethyl methacrylate (PMMA). Further, a silicon-based material such as polydimethylsiloxane (PDMS) may also be used.

Specifically, the first structure 200a may include a plurality of inflow passages 210a formed on one side of the first structure 200a and a plurality of outflow passages 210b formed on the other side of the first structure. Further, the inflow passage 210a may be connected from a first inlet port 212 formed on one side of the first structure 200a to a second inlet port 214 formed in a lower portion of the first structure 200a, and the outflow passage 210b may be connected from a first outlet port 216 formed in the lower portion of the first structure 200a to a second outlet port 218 formed on the other side of the first structure 200a.

Meanwhile, the plurality of inflow passages 210a and the plurality of outflow passages 210b may be formed to be connected to the plurality of micro-flow channels 210c of the micro-flow channel layer 200c formed in the second structure 200b. Specifically, the second inlet port 214 may be formed to be in contact with one side of the micro-flow channel 210c to connect the first inflow passage 210a to the micro-flow channel 210c.

Further, the first outlet port 216 may be formed to be in contact with the other side of the micro-flow channel 210c to connect the outflow passage 210b to the micro-flow channel 210c.

That is, the micro-channel 210 may be configured by connecting the inflow passage 210a, the micro-flow channel 210c, and the outflow passage 210b. Therefore, the buffer solution 50 containing the sample injected through the inflow passage 210a may pass through the micro-flow channel 210c and be discharged to the first outflow passage 210b.

In other words, the second structure 200b may include the micro-flow channel layer 200c, and the micro-flow channel layer 200c may include the plurality of micro-flow channels 210c. In the meantime, the micro-flow channel layer 210c may be formed of an acrylic resin such as polymethyl methacrylate (PMMA), but the present disclosure is not limited thereto.

The second structure 200b may include the sample detecting layer 500 provided on a bottom surface of a groove formed by the plurality of micro-flow channels 210c. The sample detection layer 500 may include the substrate 510, the dielectric thin film 520 formed on the substrate 510, and the adsorption layer 530 formed on the dielectric thin film 520. The bioadhesive material for detecting the sample 1 may be fixed to the adsorption layer 530.

The substrate 510 may be made of one or more materials selected from silicon, a dielectric material, or a semiconductor. When the substrate 510 is made of silicon, silicon provides constant and stable physical properties with low costs. Further, when the substrate 510 is made of a semiconductor or dielectric material, the semiconductor or dielectric material is greatly different from a biomaterial in terms of refractive index, and the measurement sensitivity in the p-wave or s-wave non-reflection condition may be relatively increased in comparison with silicon. In addition, the substrate 510 may have a complex refractive index of approximately 3.8391+i0.018186 at 655 nm.

The dielectric thin film 520 formed on the substrate 510 may be configured as any one of a transparent semiconductor oxide film and a glass film. A thickness of the dielectric thin film 520 may be more than 0 and 10 mm or less.

An example of the most common dielectric thin film 520 is a silicon oxide film $SiO_2$ which is obtained by naturally oxidizing silicon to be grown to a thickness of several nanometers. The refractive index of the silicon oxide film is approximately 1.456 at 655 nm which is significantly different from the refractive index of the substrate 510 formed of silicon and helps to increase the measurement sensitivity of the present disclosure.

Further, the dielectric thin film 520 may use a glass film formed of optical glass. The dielectric thin film 520 which is formed of silicon, the silicon oxide film or the glass film may be manufactured to have a constant refractive index as compared with a metal thin film such as gold and silver, thereby providing a stable optical property and lowering the production cost.

The adsorption layer 530 according to the embodiment of the present disclosure may be configured by at least one of a self-assembled thin film and a bio thin film. Further, a bioadhesive material which may detect a specific sample may be fixed to the adsorption layer 530. In this case, the adsorption layer 530 may serve to adsorb or dissociate a sample 1 of a low-molecular weight bioadhesive material and reflect the transmitted light 20.

In other words, the sample contained in the buffer solution which flows through the inflow passage 210a may be adsorbed onto the adsorption layer 530 or dissociated from the adsorption layer 530.

The sample injection unit 600 may inject the buffer solution or the buffer solution containing the sample into the micro-channel 210 or discharge the buffer solution or the buffer solution containing the sample. In addition to the use of the buffer solution, gas may be used as a medium for the micro-channel 210 in order to measure a biomarker contained in the gas. In this case, air may be used as the gas. However, the present disclosure is not limited thereto. Another gas may be used instead of air. In this case, the sample injection unit 600 may inject air containing the biomarker into the micro-channel 210.

When the gas is injected into the micro-channel 210, the polarized light may pass through the prism 110 to define the incident light 10 that enters a prism-gas interface that adjoins the prism 110 and the gas, and a part of the incident light 10 may be reflected by the prism-gas interface and then pass through the prism 110 to define the first reflected light 30. Even in this case, it is possible to obtain a high-sensitivity signal in the p-wave or s-wave non-reflection condition.

Operation of First Embodiment

Hereinafter, an operation of the exemplary embodiment will be described in detail with reference to the accompanying drawings.

As illustrated in FIGS. 5 to 7, the prism 110 may use a single prism structure. The incident light 10 may pass through the prism 110 and enter the prism-buffer solution interface 111. At the prism-buffer solution interface 111, the incident light 10 may be divided into the first reflected light 30 and the transmitted light 20. The transmitted light 20 may be reflected by the sample detection layer 500 and enter the reflection structure 120 positioned at the prism-buffer solution interface 111. Further, the transmitted light 20 entering the reflection structure 120 may be reflected by the reflection structure 120, enter the sample detection layer 500 again, and be reflected. Further, after the multi-reflection is performed by performing the reflection and light incidence multiple times, the transmitted light 20 may pass through the prism 110 and the prism-buffer solution interface 111 having no reflection structure 120 to define the second reflected light 40. In this case, as the number of reflection of the multi-reflection increases, an interval between the first reflected light 30 and the second reflected light 40, which are spatially separated, (a spacing distance between optical paths) may increase.

As described above, the polarized light detecting unit 400 may derive information on physical properties related to the thickness or optical characteristics of the sample 1 by receiving the second reflected light 40 and analyzing the polarized state of the second reflected light 40. However, as illustrated in FIG. 5, when the reflection structure 120 is not used, the interval between the optical path of the first reflected light 30 and the optical path of the second reflected light 40 is small, and the first reflected light 30 and the second reflected light 40 are not easily separated, such that the entire reflected light may enter the polarized light detecting unit 400.

That is, in the related art, there is a problem in that it is difficult to separate the light reflected at the interface of the prism 110 and the medium from light which is refracted to be incident onto the adsorption layer 530, and accordingly, the light reflected at the interface between the prism 110 and the medium is refracted and is detected by the polarized light detecting unit 400 together with the light incident on the adsorption layer 530. Therefore, a measurement error is caused by the light having a relatively high energy which is reflected from the interface of the prism 110 and the medium and measurement sensitivity is lowered.

In addition, there is a problem in that to receive only the second reflected light 40 by using the polarized light detecting unit 400, a separate optical system needs to be disposed forward of the polarized light detecting unit 400 or a size of a beam spot of the incident light 10 needs to be minimized.

To solve the above-mentioned problem, as illustrated in FIGS. 6 and 7, the reflection structure 120 is formed on the bottom surface of the prism 110 to induce the multi-reflection of the transmitted light 20. Therefore, the interval between the optical path of the first reflected light 30 and the optical path of the second reflected light 40 may be remarkably increased, and the first reflected light 30 and the second reflected light 40 may be spatially separated, such that the polarized light detecting unit 400 may receive the second reflected light 40. Therefore, it is possible to improve the measurement sensitivity of the micro-channel measurement device according to the present disclosure by preventing a measurement error.

That is, when the polarized light detecting unit 400 is positioned to be spaced apart from the prism unit 100 at a particular distance, the spacing distance between the second reflected light 40 and the first reflected light 30 increases. Therefore, it is possible to minimize the light amount of the first reflected light 30 focused on the polarized light detecting unit 400. In addition, when an optical axis of the polarized light detecting unit 400 is aligned with the optical path of the second reflected light 40, it is possible to minimize an influence of a small amount of first reflected light 30 unnecessarily focused on the polarized light detecting unit 400. That is, a propagation loss of the first reflected light 30 is larger than a propagation loss of the second reflected light 40 while the light propagates in the polarized light detecting unit 400. Therefore, the light amount of the first reflected light 30 reaching the polarized light detecting unit 400 may be restricted to a relatively minimal amount in comparison with the light amount of the second reflected light 40.

As a result, the micro-channel measurement device according to the present disclosure may easily separate the first reflected light 30 and the second reflected light 40 including information on the properties of the sample 1, thereby preventing the measurement error and easily analyzing the sample 1 with high sensitivity.

FIG. 12 is a graph illustrating a change in amplitude of the second reflective light 40 in accordance with the number of reflection of the transmitted light 20 implemented by p-polarized waves according to the embodiment of the present disclosure, and FIG. 13 is a graph illustrating a change in amplitude of the second reflective light 40 in accordance with the number of reflection of the transmitted light 20 implemented by s-polarized waves according to the embodiment of the present disclosure. In this case, the graphs illustrated in FIGS. 12 and 13, are graphs related to the ellipsometric constant $\Psi$.

In this case, FIG. 12A is a graph related to a case in which the number of reflection of the transmitted light 20 implemented by the p-polarized wave in respect to the reflection structure 120 illustrated in FIG. 5 is 0. FIG. 12B is a graph related to a case in which the number of reflection of the transmitted light 20 implemented by the p-polarized wave in respect to the reflection structure 120 illustrated in FIG. 6 is 1. FIG. 12C is a graph related to a case in which the number of reflection of the transmitted light 20 implemented by the p-polarized wave in respect to the reflection structure 120 illustrated in FIG. 7 is 2.

Further, FIG. 13A is a graph related to a case in which the number of reflection of the transmitted light 20 implemented by the s-polarized wave in respect to the reflection structure 120 illustrated in FIG. 5 is 0. FIG. 13B is a graph related to a case in which the number of reflection of the transmitted light 20 implemented by the s-polarized wave in respect to the reflection structure 120 illustrated in FIG. 6 is 1. FIG. 13C is a graph related to a case in which the number of reflection of the transmitted light 20 implemented by the s-polarized wave in respect to the reflection structure 120 illustrated in FIG. 7 is 2.

The graphs illustrated in FIGS. 12A to 12C and 13A to 13C are expressed by bold (red) lines.

As illustrated in FIGS. 12A to 12C, it can be seen that the amplitude of the second reflected light 40 increases (the amplitude increases from 1 nm to 3 nm) as the number of reflection of the transmitted light 20 implemented by the p-polarized wave in respect to the reflection structure 120 increases. Further, as illustrated in FIGS. 13A to 13C, it can be seen that the amplitude of the second reflected light 40 increases (the amplitude increases from 1 nm to 3 nm) as the number of reflection of the transmitted light 20 implemented by the s-polarized wave in respect to the reflection structure 120 increases.

As described above, it can be seen that as the number of reflection of the transmitted light 20 in respect to the reflection structure 120 increases, the amplitude of the second reflected light 40 increases, and the second reflected light 40 is amplified.

Hereinafter, a micro-channel measurement method using the micro-channel measurement device according to the present disclosure will be described.

First, in a first step, the sample injection unit 600 may inject the buffer solution 50 into the micro-channel structure 200 including the one or more micro-channels 210, each having the sample detection layer 500 with the fixed bio-adhesive material for detecting the sample 1. Further, the sample injecting unit may inject the buffer solution 50 into each of the micro-channels 210 with a time interval. Further, the buffer solution 50 may be injected only into some of the micro-channels 210 and the other micro-channels 210 may not be used.

Next, in the second step, the sample 1 contained in the buffer solution 50 may be adsorbed to an antibody of the sample detection layer 500. Alternatively, the sample may be adsorbed on a plurality of adsorption layers on a plurality of different self-assembled monolayer films or identical self-assembled monolayer films formed on the single micro-channel 210c of FIG. 11 to form adsorption layers having different junction characteristics. Further, in a third step, the polarized light generating unit 300 may generate the polarized light.

Next, in a fourth step, the polarized light may pass through the prism 110 to define the incident light 10 that enters the prism-buffer solution interface 111 that adjoins the prism 110 and the buffer solution 50. Further, in a fifth step, a part of the incident light 10 may be reflected by the prism-buffer solution interface 111 to define the reflected light that passes through the prism 110. Another part of the incident light 10 may pass through the buffer solution 50 to define the transmitted light 20 that enters the sample detection layer 500 at an incident angle that satisfies the polarized wave non-reflection condition.

Thereafter, in sixth step, the transmitted light 20 may be reflected by the sample detection layer 500 and mirror-reflected by the reflection structure 120 at the prism-buffer solution interface 111, and the transmitted light 20 may perform multi-reflection by repeatedly performing the reflection and light incidence multiple times, then pass through the prism 110 to define second reflected light 40. In this case, by performing the fifth and sixth steps, the first reflected light 30 and the second reflected light 40, which are discharged to the outside of the prism unit 100, may be spatially and completely separated by the multi-reflection.

Next, in a seventh step, the polarized light detecting unit 400 may detect the polarization change of the second reflected light 40. Further, in an eighth step, the concentration of the sample 1 adsorbed to the sample detection layer 500 may be detected based on the polarization change of the second reflected light 40.

More specifically, first, the analyzer 410 may receive the second reflected light 40 which is elliptically polarized on the adsorption layer 530 to pass only light according to the polarization characteristic. Next, the photo detector 420 may detect the change of the polarized component of the second reflected light 40 to obtain predetermined optical data, convert the optical data into an electrical signal, and transmit the electrical signal to a processor 430.

Next, the processor 430 including a program using reflectometry or ellipsometry extracts and interprets the optical data converted to the electrical signal to deduct values such as an adsorption concentration of the sample, an adsorption and dissociation constant, a refractive index of the sample, and a refractive index of the buffer solution.

In this case, according to the present disclosure, the processor 430 may calculate an ellipsometric constant $\Delta$ on a phase difference of the ellipsometry to measure a measurement value of a refractive index of the buffer solution 50 and measure an ellipsometric constant $\Psi$ on an amplitude ratio to calculate the binding kinetics. This is because the ellipsometric constant $\Delta$ on a phase difference is only sensitive to the refractive index change of the buffer solution 50 and is less affected by the junction characteristics in the p-polarized wave non-reflection condition, so that the refractive index change of the buffer solution may be only measured. Further, the ellipsometric constant $\Psi$ on an amplitude ratio is highly sensitive to the junction characteristics of the material.

Accordingly, the junction characteristics of the sample contained in the buffer solution to flow may be measured as $\Psi$ and simultaneously the refractive index change of the buffer solution with the sample dissolved therein or the refractive index change of the buffer solution containing a solvent such as DMSO added for dissolving the sample may be determined as $\Delta$, thereby determining only pure junction characteristics.

It will be appreciated that the embodiments of the present disclosure have been described above for purposes of illustration, and those skilled in the art may understand that the present disclosure may be easily modified in other specific forms without changing the technical spirit or the essential features of the present disclosure. Therefore, it should be understood that the above-described embodiments are illustrative in all aspects and do not limit the present specification. For example, each component described as a single type may be carried out in a distributed manner. Likewise, components described as a distributed type can be carried out in a combined type.

The scope of the present disclosure is represented by the claims to be described below, and it should be interpreted that the meaning and scope of the claims and all the changes or modified forms derived from the equivalent concepts thereto fall within the scope of the present disclosure.

DESCRIPTION OF REFERENCE NUMERALS

1: Sample
2: Ligand
10: Incident light
20: Transmitted light
30: First reflected light
40: Second reflected light
50: Buffer solution
100: Prism unit
110: Prism
111: Prism-buffer solution interface
120: Reflection structure
200: Micro-channel structure
200a: First structure
200b: Second structure
200c: Micro-flow channel layer
210: Micro-channel
210a: Inflow passage
210b: Outflow passage
210c: Micro-flow channel
212: First inlet port
214: Second inlet port
216: First outlet port
218: Second outlet port
220: Support
300: Polarized light generating unit
310: Light source
320: Polarizer
330: Collimating lens
340: Focusing lens
350: First compensator
400: Polarized light detecting unit
410: Analyzer
420: Photodetector
430: Processor
440: Second compensator
450: Spectrometer
500: Sample detection layer
510: Substrate
520: Dielectric thin film
530: Adsorption layer
600: Sample injection unit

The invention claimed is:

1. A multi-reflection liquid immersion silicon-based micro-channel measurement device comprising:
a micro-channel structure comprising a support, and one or more micro-channels formed on the support, each of the one or more micro-channels including a sample detection layer with a fixed bioadhesive material for detecting a sample, wherein the micro-channel is injected with a buffer solution containing the sample;
a prism unit comprising a single prism structure, and a reflection structure formed by coating a bottom surface of the prism with a mirror reflection material;
a polarized light generating unit including one or more lenses, the polarized light generating unit configured to generate polarized light; and
a polarized light detecting unit including a processor, the polarized light detecting unit configured to detect a polarization change of reflected light,
wherein the polarized light passes through the prism to define incident light that enters a prism-buffer solution interface that adjoins the prism and the buffer solution,
wherein a part of the incident light is reflected by the prism-buffer solution interface and then passes through the single prism structure to define first reflected light,
wherein another part of the incident light passes through the prism-buffer solution interface, performs multi-reflection by repeatedly performing reflection and light incidence multiple times by the sample detection layer and the reflection structure, and then passes through the single prism structure to define second reflected light, and
wherein an interval between respective optical paths of the first reflected light and the second reflected light is induced by the multi-reflection to spatially and completely separate the first reflected light and the second reflected light such that the polarized light detecting unit is induced not to receive the first reflected light.

2. The multi-reflection liquid immersion silicon-based micro-channel measurement device of claim 1, wherein another part of the incident light passes through the buffer solution to define transmitted light that enters the sample detection layer at an incident angle that satisfies a p-polarized wave non-reflection condition, and
wherein the transmitted light is reflected by the sample detection layer, is mirror-reflected by the reflection structure at the prism-buffer solution interface, performs the multi-reflection, and then passes through the prism to define second reflected light.

3. The multi-reflection liquid immersion silicon-based micro-channel measurement device of claim 2, wherein the sample detection layer comprises:
a substrate, a dielectric thin film formed on the substrate; and
an adsorption layer formed on the dielectric thin film, and wherein the bioadhesive material for detecting the sample is fixed to the adsorption layer.

4. The multi-reflection liquid immersion silicon-based micro-channel measurement device of claim 3, wherein when light is reflected by the sample multiple times through the multi-reflection and reflectance of the p-polarized wave non-reflection deteriorates, a thickness of the dielectric thin film increases to prevent a deterioration in signal intensity of the transmitted light.

5. The multi-reflection liquid immersion silicon-based micro-channel measurement device of claim 3, wherein when light is reflected by the sample multiple times through the multi-reflection and reflectance of the p-polarized wave non-reflection deteriorates, the transmitted light, which enters the sample detection layer at an incident angle that satisfies s-polarized wave non-reflection condition, is formed to prevent a deterioration in signal intensity of the transmitted light.

6. The multi-reflection liquid immersion silicon-based micro-channel measurement device of claim 3, wherein the substrate is made of one or more materials selected from silicon, a dielectric material, or a semiconductor.

7. The multi-reflection liquid immersion silicon-based micro-channel measurement device of claim 3, wherein the polarized light detecting unit calculates a thickness or concentration of the sample adsorbed to the adsorption layer based on a polarization change of the second reflected light.

8. The multi-reflection liquid immersion silicon-based micro-channel measurement device of claim 1, wherein the polarized light generating unit adjusts a light amount of the incident light entering through the prism and controls a shape of a beam spot of the incident light formed on the prism-buffer solution interface.

9. The multi-reflection liquid immersion silicon-based micro-channel measurement device of claim 1, wherein gas, instead of the buffer solution, is injected into the micro-channel to measure a biomarker contained in air or the gas.

10. The multi-reflection liquid immersion silicon-based micro-channel measurement device of claim 9, wherein when the gas is injected into the micro-channel, the polarized light passes through the prism to define incident light that enters a prism-gas interface that adjoins the prism and the gas, and a part of the incident light is reflected by the prism-gas interface and then passes through the prism to define the first reflected light.

11. A measurement method, which uses the multi-reflection liquid immersion silicon-based micro-channel measurement device according to claim 1, the measurement method comprising:
- a first step of injecting, by the sample injection unit, the buffer solution into the micro-channel structure comprising the one or more micro-channels each having the sample detection layer with the fixed bioadhesive material for detecting the sample;
- a second step of adsorbing the sample contained in the buffer solution to an antibody of the sample detection layer;
- a third step of generating, by the polarized light generating unit, polarized light;
- a fourth step of allowing the polarized light to pass through a single prism structure to define incident light that enters the prism-buffer solution interface that adjoins the prism and the buffer solution;
- a fifth step of allowing a part of the incident light is reflected at the prism-buffer solution interface to define the first reflected light that passes through the single prism structure and allowing another part of the incident light to pass through the buffer solution to define transmitted light that enters the sample detection layer at an incident angle that satisfies a polarized wave non-reflection condition;
- a sixth step of allowing the transmitted light to be reflected at the sample detection layer and mirror-reflected by the reflection structure at the prism-buffer solution interface so as to perform multi-reflection by repeatedly performing reflection and light incidence multiple times, and then allowing the transmitted light to pass through the single prism structure to define second reflected light;
- a seventh step of detecting, by a polarized light detecting unit, a polarization change of the second reflected light; and
- an eighth step of detecting a concentration of the sample adsorbed to the sample detection layer based on the polarization change of the second reflected light, wherein an interval between the first reflected light and the second reflected light is induced by the multi-reflection to spatially and completely separate the first reflected light and the second reflected light such that the polarized light detecting unit is induced not to receive the first reflected light.

* * * * *